(12) United States Patent
Hovgaard et al.

(10) Patent No.: US 12,224,590 B2
(45) Date of Patent: Feb. 11, 2025

(54) METHOD OF CONTROLLING A WIND POWER PLANT

(71) Applicant: VESTAS WIND SYSTEMS A/S, Aarhus N. (DK)

(72) Inventors: Tobias Gybel Hovgaard, Ry (DK); Jacob Deleuran Grunnet, Tranbjerg J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 99 days.

(21) Appl. No.: 17/763,132

(22) PCT Filed: Aug. 26, 2020

(86) PCT No.: PCT/DK2020/050239
§ 371 (c)(1),
(2) Date: Mar. 23, 2022

(87) PCT Pub. No.: WO2021/058071
PCT Pub. Date: Apr. 1, 2021

(65) Prior Publication Data
US 2022/0285945 A1    Sep. 8, 2022

(30) Foreign Application Priority Data
Sep. 23, 2019 (DK) .......................... PA 2019 70582

(51) Int. Cl.
*H02J 3/32* (2006.01)
*F03D 7/04* (2006.01)
(Continued)

(52) U.S. Cl.
CPC ................ *H02J 3/32* (2013.01); *F03D 7/048* (2013.01); *H02J 3/003* (2020.01); *H02J 3/381* (2013.01); *H02J 2300/28* (2020.01)

(58) Field of Classification Search
CPC .... H02J 3/32; H02J 3/003; H02J 3/381; H02J 2300/28; F03D 7/048
See application file for complete search history.

(56) References Cited

U.S. PATENT DOCUMENTS

2015/0001931 A1\* 1/2015 Banham-Hall ........... H02J 3/28
307/24
2015/0076821 A1 3/2015 Ekanayake et al.
(Continued)

FOREIGN PATENT DOCUMENTS

CN     105244920 A    1/2016
CN     107069814 A    8/2017
(Continued)

OTHER PUBLICATIONS

Danish Patent and Trademark Office, 1st Technical Examination including The Search Report and Search Opinion for Application PA 2019 70582 dated Mar. 24, 2020.
(Continued)

*Primary Examiner* — Viet P Nguyen
(74) *Attorney, Agent, or Firm* — Patterson + Sheridan, LLP

(57) ABSTRACT

A method of controlling a wind power plant including an energy storage device, the wind power plant being connected to a power grid and comprising one or more wind turbine generators that produce electrical power for delivery to the power grid, the method comprising: processing grid data related to the power grid to determine a probability forecast for a future state of the grid; and controlling charging and discharging of the energy storage device in accordance with the probability forecast.

20 Claims, 3 Drawing Sheets

(51) Int. Cl.
*H02J 3/00* (2006.01)
*H02J 3/38* (2006.01)

(56) References Cited

U.S. PATENT DOCUMENTS

2016/0322835 A1* 11/2016 Carlson ................. G05B 15/02
2017/0237259 A1 8/2017 Yoon et al.

FOREIGN PATENT DOCUMENTS

| | | |
|---|---|---|
| CN | 107404129 A | 11/2017 |
| CN | 108429288 A | 8/2018 |
| CN | 108647415 A | 10/2018 |
| WO | 2012000517 A2 | 1/2012 |
| WO | 2013000474 A2 | 1/2013 |
| WO | 2018156700 A1 | 8/2018 |
| WO | 2021058071 A1 | 4/2021 |

OTHER PUBLICATIONS

PCT, Notification of Transmittal of The International Search Report and The Written Opinion of The International Searching Authority, or The Declaration for Application PCT/DK2020/050239 date Oct. 14, 2020.

\* cited by examiner

METHOD OF CONTROLLING A WIND POWER PLANT

TECHNICAL FIELD

The invention relates to a method and control system for controlling a wind power plant that includes an energy storage device, and in particular the invention relates to control of a state of charge of the energy storage device.

BACKGROUND TO THE INVENTION

A wind power plant comprises a group of wind turbine generators that convert energy contained in wind into electrical power, which is typically delivered to a power grid. Differences in wind conditions across the site of a wind power plant may entail a different power output from each generator. Moreover, the changeable nature of wind over time leads to a correspondingly stochastic electrical power output from each of the generators.

At the same time, a range of events may occur on the grid that after the power demanded from the wind power plant, including: changes in power consumption by loads connected to the grid; planned changes to the grid, such as adding new loads; real-time electricity price fluctuations; and critical grid events, including faults such as sudden changes in voltage or frequency on the grid.

The properties of the signal that the wind power plant delivers to the grid, in particular the frequency and phase angle of that signal, must be aligned to instantaneous grid requirements. The wind power plant must also deliver active and reactive power at levels demanded by the grid. These requirements can change abruptly during a grid event, in which case the wind power plant may have to react by modifying its output.

So, the manner in which the outputs from each wind turbine generator of the wind power plant are collated and delivered to the grid must be carefully managed. Accordingly, a wind power plant must incorporate means for controlling its output in a dynamic manner to react to varying grid demand whilst also compensating for varying wind conditions.

One such means is the inclusion of one or more energy storage devices within the wind power plant. Indeed, including energy storage in some form may be essential if the grid requires the wind power plant to be controlled as a virtual synchronous machine (VSM) to provide a desired output that is shielded from fluctuations in the generated power, or 'virtual inertia'. Such energy storage devices are typically chargeable and dischargeable on command, and are capable of storing significant quantities of charge that enable them to augment the power supplied by the wind turbine generators over short but sustained periods. Accordingly, these energy storage devices are distinct from the relatively smaller smoothing capacitors and inductors that are routinely included in power converters and filters of a wind power plant.

In practical terms, a respective energy storage device can be integrated into each wind turbine generator to provide inertia for the generators individually. For example, an energy storage device may be coupled to a DC link of a power converter of a wind turbine generator. In this case, the energy storage device can be charged or discharged to relieve demands on the wind turbine generator. For example, in a high wind scenario the energy storage device could be discharged to allow the generator to lower its power output to implement damping, for reduced structural loading. However, the ability of the energy storage device to act in this way is curtailed by the need to reserve charge that may be needed during critical grid events.

Alternatively, or in addition, an energy storage device can be attached to a point of common coupling (PCC) to provide virtual inertia for the power plant as a whole, in which case similar operational constraints apply.

In either case, control of the energy storage device for optimised operation is a challenge in view of the conflicting demands that arise in service. For example, the need to ensure adequate capacity to absorb spikes in power production must be balanced against the constraint to reserve sufficient charge to compensate for momentary drops in power production or to cope with fault scenarios such as a low voltage ride-through. Another factor to consider is that it may be desirable to increase the state of charge of the energy storage device when electricity prices are low, in the hope of increasing revenue by selling the energy when prices rise. Conversely, a lower state of charge might be expected when electricity prices are high.

It is against this background that the invention has been devised.

SUMMARY OF THE INVENTION

An aspect of the invention provides a method of controlling a wind power plant. The wind power plant is connected to a power grid, and includes an energy storage device and one or more wind turbine generators that produce electrical power for delivery to the power grid. The method comprises processing grid data related to the power grid to determine a probability forecast for a future state of the grid, and controlling charging and discharging of the energy storage device in accordance with the probability forecast.

In contrast with known approaches that seek to predict future inputs to a wind power plant in a discrete or deterministic manner, the method of the invention bases control of an energy storage device of the wind power plant on a probability forecast for an input to the plant—specifically the state of the grid—which represents potential future grid events probabilistically. In other words, the probability forecast for the state of the grid provides an indication of the relative probabilities of a range of events or changes in state occurring over a certain time window. This approach is less susceptible to inaccuracy than a discrete prediction, and thus enables enhanced optimisation of operation of the energy storage device, which typically entails finding an optimal state of charge for the device.

The method may comprise determining a set of chance-constraints relating to operation of the wind power plant, determining respective limits for each chance-constraint of the set, and determining, based on each chance-constraint limit and the probability forecast, a set of device constraints relating to charging and/or discharging of the energy storage device. Charging and discharging of the energy storage device is then controlled to avoid violating the device constraints, which it is noted are determined in accordance with the probability forecast. Accordingly, such methods enable optimised usage of the energy storage device whilst controlling the risk of violating operational constraints for the device and/or the wind power plant, thereby enhancing flexibility in control relative to a conventional approach.

Such methods may also comprise solving an optimisation problem for controlling charging and discharging of the energy storage device, the optimisation problem comprising the device constraints, in which case charging and discharging of the energy storage device is controlled based on a control output of the optimisation problem.

The optimisation problem may be solved using a predictive algorithm. For example, the method may comprise simulating operation of the wind power plant using the predictive algorithm. In such embodiments, the predictive algorithm may be based on a chance-constrained model predictive control strategy. In other words, in such embodiments the state of charge of the energy storage device may be optimised using chance-constrained model predictive control.

Each limit may define a proportion of operation time of the wind power plant for which the respective chance-constraint may be violated.

Each chance-constraint of the set of chance-constraints optionally comprises a requirement to provide any of the following: virtual inertia; grid frequency control; a limited ramp-rate for power delivered to the power grid; defined power output profiles during a voltage ride-through event; power-line flicker reduction; reactive power injection; grid oscillation damping; side-side torque damping; drivetrain torque damping; upward yaw control; and noise below a threshold level.

In some embodiments, the method comprises determining a state of charge setpoint for the energy storage device, and controlling charging and discharging of the energy storage device in accordance with the state of charge setpoint.

The probability forecast optionally comprises any of: a cumulative distribution function; and a probability density function.

The method may comprise processing data indicative of wind conditions to determine a probability forecast for wind conditions, and controlling charging and discharging of the energy storage device in accordance with the probability forecast for wind conditions. Thus, embodiments of the invention allow for control of the energy storage device based on the likelihood of changes to multiple inputs to the wind power plant, namely the state of the grid and wind conditions. Probability forecasts may be derived for other inputs also, including the states of auxiliary systems of the wind power plant such as frost protection systems, in which case these can also be taken into account in the control of the energy storage device.

Charging and discharging of the energy storage device may be controlled in accordance with a prescribed probability of violating one or more grid requirements.

The grid data may comprise any of the following: data indicative of a state of the power grid; a ramp-rate limit with respect to the power delivered to the power grid; a request received from the power grid; grid design data; historical grid data; data indicative of a weak grid obtained from plant-level and/or turbine-level analysis; electricity pricing data; and user-entered forecasts indicative of planned changes to the power grid.

The method may comprise altering operation of one or more wind turbine generators of the wind power plant in accordance with the, or each probability forecast, and controlling charging and discharging of the energy storage device in accordance with the altered operation of the or each wind turbine generator in addition to the, or each, probability forecast.

The energy storage device may be electrically coupled to a point of common coupling at which the wind power plant connects to the power grid. Alternatively, the energy storage device may be integrated into a wind turbine generator of the wind power plant. It is also possible for the wind power plant to include multiple energy storage devices, for example a storage device integrated into the, or each wind turbine generator, and a further energy storage device coupled to the point of common coupling.

Another aspect of the invention provides a control system for a wind power plant. The wind power plant is connected to a power grid and includes an energy storage device and one or more wind turbine generators that produce electrical power for delivery to the power grid. The control system comprises: an input configured to receive grid data related to the power grid; a processing module configured to process the grid data to determine a probability forecast for a future state of the grid, and generate a control signal arranged to control charging and discharging of the energy storage device in accordance with the probability forecast; and an output configured to output the control signal.

The control system may be configured to perform the method of the above aspect.

The invention also extends to a wind power plant comprising the control system of the above aspect.

It will be appreciated that preferred and/or optional features of each aspect of the invention may be incorporated alone or in appropriate combination in the other aspects of the invention also.

BRIEF DESCRIPTION OF THE DRAWINGS

So that it may be more fully understood, the invention will now be described, by way of example only, with reference to the following drawings, in which.

DETAILED DESCRIPTION OF EMBODIMENTS OF THE INVENTION

Figure 1:
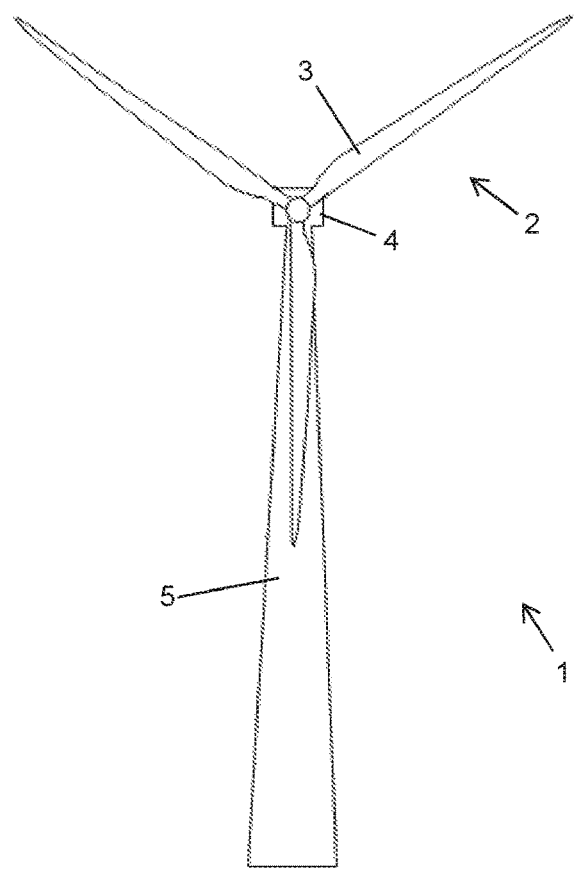
FIG. 1 is a schematic diagram of a wind turbine generator that is suitable for use with embodiments of the invention.

In general terms, embodiments of the invention provide methods and control systems for optimising operation of one or more energy storage devices incorporated into a wind power plant, by modelling inputs to the wind power plant probabilistically and, based on the respective likelihoods of various possible changes in the inputs, determining an optimal strategy for charging and discharging the, or each, device.

For example, statistical properties or probability forecasts such as a probability density function may be derived for future wind conditions and/or grid events, optionally using a predictive algorithm. A setpoint for the state of charge of an energy storage device can then be determined in accordance with these probabilistic variables. This results in a setpoint that is less susceptible to inaccuracies in the predictions and thereby accounts for the stochastic nature of these inputs to the wind power plant.

Specifically, in the embodiments described below the predictive algorithm forms part of a chance-constrained model predictive control approach, in which limits are set for chance-constraints relating to operation of the wind power plant, which can then be converted into hard constraints for operation of one or more energy storage devices of the wind power plant using the probability density function derived for each input. These hard constraints then feed into a model predictive control algorithm, which solves an optimisation problem to find an optimal state of charge and/or a charge/discharge strategy for the, or each, energy storage device.

In this context, the relevant chance-constraints relate to changes in the inputs to the power plant, in particular changes in wind conditions and grid events, which reflect situations in which either charging or discharging of the energy storage device(s) may be required, either directly or indirectly, and this particular form of model predictive control accounts for the chance of each of those situations arising when determining a strategy for charging and discharging the energy storage device(s).

The conflicting requirements relevant to each chance-constraint can be weighed against one another in the context of the respective probabilities of each of those chance-constraints being violated or having to be met in operation, thereby enabling an optimised state of charge for the energy storage device(s) to be found.

In a simple example, a pair of conflicting constraints may be a requirement for an energy storage device to provide virtual inertia to absorb excess power in the event that wind energy peaks momentarily, and a separate requirement for that energy storage device to discharge energy during a low voltage ride-through event. The probability that each of these scenarios will arise can be determined based on probabilistic modelling of future wind conditions and grid events, and an optimised state of charge can be weighted towards the more likely scenario, thus minimising the overall likelihood of violating either constraint and ensuring that violations of the chance-constraints are kept within prescribed limits in the long term. In practice, there will be many more variables and possible outcomes to consider, leading to a complex optimisation problem to solve.

As electricity prices can vary considerably over short time-frames, there is potential for cost-optimising operation of the energy storage device(s) to increase revenue by modifying a charge/discharge strategy for the energy storage device(s) in accordance with expected price variations, while meeting minimum grid requirements in the interim.

Further examples of specific constraints that may be taken into account are described in more detail below, but it is noted at this stage that modelling the various possible scenarios probabilistically enables the setpoint or other charge/discharge strategy to be optimised to a much greater extent than is possible in prior art approaches that deal only with instantaneous conditions. Even approaches that attempt to predict future inputs in a deterministic manner are vulnerable to inaccuracies in their predictions, especially for inputs as volatile as wind conditions or grid events. In contrast with such approaches, instead of basing control on a predicted outcome, embodiments of the invention base control on the respective chances of a range of outcomes.

As any form of forecasting involves uncertainty, previous approaches set hard limits or margins for the state of charge of energy storage devices, those limits providing a buffer against sub-optimised operation. However, implementing such margins precludes full usage of the capacity of the device. In this context, an advantage offered by embodiments of the invention is that the optimised state of charge setpoint for the energy storage device takes into account uncertainties in the inputs to the wind power plant and therefore avoids the need to apply margins to the state of charge of the device, thus enhancing utilisation of the capacity of the device.

A specific implementation of such an approach is outlined below with reference to FIGS. 1 to 3, which demonstrates how the inventive concept can be incorporated into an existing wind power plant control architecture. It should be appreciated that this implementation is described by way of example only, and embodiments of the invention will find application in all wind power plant architectures.

Accordingly, to provide context for the invention, FIG. 1 shows an individual wind turbine generator 1 of a kind that may be controlled according to embodiments of the invention. It should be appreciated that the wind turbine generator 1 of FIG. 1 is referred to here by way of example only, and it would be possible to implement embodiments of the invention into many different types of wind turbine systems.

The wind turbine generator 1 shown is a three-bladed upwind horizontal-axis wind turbine (HAWT), which is the most common type of turbine in use.

The wind turbine generator 1 comprises a turbine rotor 2 having three blades 3, the rotor 2 being supported at the front of a nacelle 4 in the usual way. It is noted that although three blades is common, different numbers of blades may be used in alternative implementations. The nacelle 4 is in turn mounted at the top of a support tower 5, which is secured to a foundation (not shown) that is embedded in the ground.

The nacelle 4 contains a generator (not shown in FIG. 1) that is driven by the rotor 2 to produce electrical energy. Thus, the wind turbine generator 1 is able to generate electrical power from a flow of wind passing through the swept area of the rotor 2 causing rotation of the blades 3.

Figure 2:
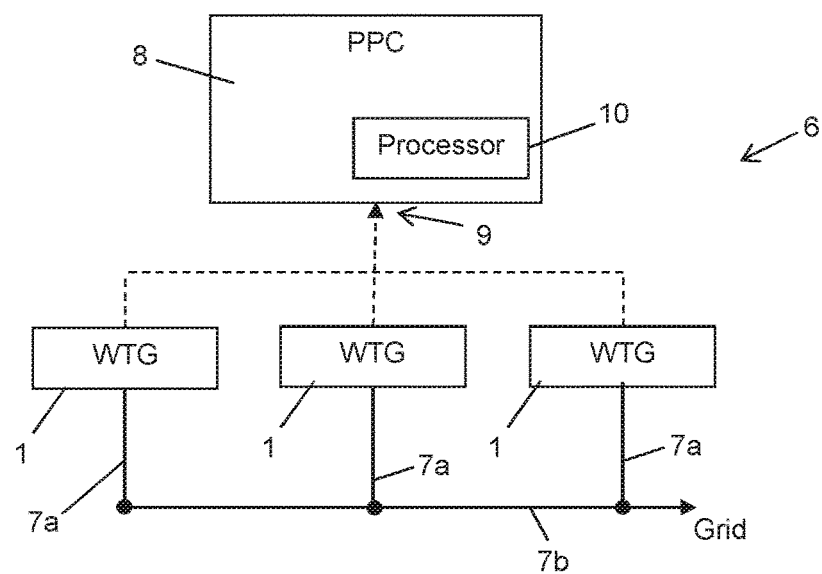
FIG. 2 is a schematic diagram of a wind power plant comprising a plurality of wind turbine generators such as that illustrated in FIG. 1.

FIG. 2 shows the wind turbine generator 1 in the context of a wind power plant 6 having a plurality of individual wind turbine generators 1; specifically, three wind turbine generators 1 are present in the wind power plant 6 shown in FIG. 2. Each wind turbine generator 1 has an output line 7a that connects to a transmission line 7b that takes electrical power generated within the wind power plant 6 to an electrical grid.

Each wind turbine generator 1 of the wind power plant 6 is connected to a power plant controller (PPC) 8 that controls operation of the wind power plant 6. In this embodiment, the PPC 8 is responsible for monitoring operating conditions and for issuing reactive power references to each wind turbine generator 1 based on an active power demand. The PPC 8 therefore represents part of a control system for controlling operation of the wind power plant 6.

To this end, the PPC 8 includes an input 9 at which operational data is received from each wind turbine generator 1. The input 9 also receives data indicative of a state of the grid and data indicative of wind conditions. The PPC 8 further includes a processor 10 that, among other things, uses the data received at the input 9 to determine active and reactive power references for the wind turbine generators 1.

Figure 3:
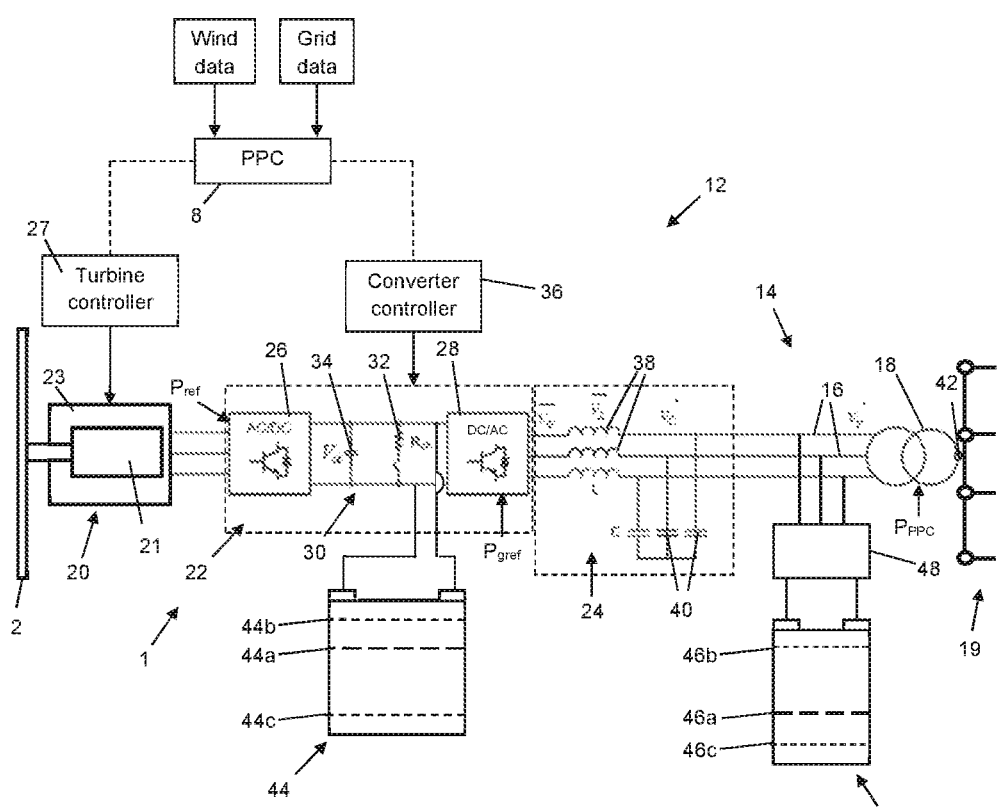
FIG. 3 is a schematic diagram of an architecture of a full-scale converter based wind power plant that is suitable for use with embodiments of the invention.

With reference now to FIG. 3, an example of a wind power plant 12 to which methods according to embodiments of the invention may be applied is shown. The example shown in FIG. 3 is based on a full-scale converter architecture, although as noted above embodiments of the invention may be used with other types of converter and in general terms the invention is suitable for use with all topologies. The wind power plant 12 shown in FIG. 3 may be configured in the same way as the wind power plant 6 shown in FIG. 2.

The components of the wind power plant 12 of FIG. 3 are conventional and as such familiar to the skilled reader, and so will only be described in overview.

The wind power plant 12 shown in FIG. 3 includes a single wind turbine generator 1 such as that shown in FIG. 1, but in practice further wind turbine generators may be included as shown in FIG. 2.

As already noted, the wind turbine generator 1 comprises an electrical generator 20 that is driven by the rotor 2 to produce electrical power. The electrical generator 20 includes a central armature 21 that is driven by the rotor 2 to rotate within a stator 23. The stator 23 contains one or more sets of three-phase windings (not shown) in which electrical current is induced in response to varying magnetic flux created by rotation of the armature 21, under the control of a turbine controller 27.

The wind power plant 12 also includes a low voltage link 14 defined by a bundle of low voltage lines 16 terminating at a coupling transformer 18, which acts as a terminal that connects the wind turbine generator 1 to a grid transmission line that in turn connects to a power grid 19. Electrical power produced by the wind turbine generator 1 is delivered to the grid 19 through the coupling transformer 18, the power delivered to the grid 19 being represented as $P_{PPC}$ in FIG. 3.

The electrical generator 20 of a full-scale architecture typically produces multiphase electrical power. In this embodiment, the power produced in the electrical generator 20 is three-phase AC, but is not in a form suitable for delivery to the grid 19, in particular because it is typically not at the correct frequency or phase angle. Accordingly, the wind turbine generator 1 includes a power converter 22 and a filter 24 disposed between the electrical generator 20 and the coupling transformer 18, to process the electrical generator output into a suitable waveform having the same frequency as the grid 19 and the appropriate phase angle.

The power converter 22 provides AC to AC conversion by feeding electrical current through an AC-DC converter, or 'machine-side converter' 26, followed by a DC-AC converter, or 'line-side converter' 28, in series. The machine-side converter 26 is connected to the line-side converter 28 by a conventional DC link 30, which includes a switched resistor 32 to act as a dump load to enable excess energy to be discharged, and a smoothing capacitor 34 providing smoothing for the DC output.

Any suitable power converter 22 may be used. In this embodiment, the AC-DC and DC-AC parts of the power converter 22 are defined by respective bridges of switching devices (not shown), for example in the configuration of a conventional two level back-to-back converter. Suitable switching devices for this purpose include integrated gate bipolar transistors (IGBTs) or metal-oxide-semiconductor field-effect transistors (MOSFETs). The switching devices are typically operated using pulse-width modulated drive signals.

The smoothed DC output of the machine-side converter 26 is received as a DC input by the line-side converter 28, which creates a three-phase AC output for delivery to the coupling transformer 18.

The AC output of the power converter 22 is carried by the three power lines 16 that together define the low voltage link 14, each line 16 carrying a respective phase. The low voltage link 14 includes the filter 24, which in this embodiment comprises a respective inductor 38 with a respective shunted filter capacitor 40 for each of the three power lines 16, to provide low-pass filtering for removing switching harmonics from the AC waveform.

As noted above, the low voltage link 14 terminates at the coupling transformer 18 which provides a required step-up in voltage. A high voltage output from the coupling transformer 18 defines a wind turbine generator terminal 42, which acts as a point of common coupling for the wind power plant 12.

As noted above, in a full-scale architecture the line-side converter 28 is configured to provide a level of control over the characteristics of the AC power produced, for example to increase the relative reactive power in dependence on grid demand. Noting that the magnitude, angle and frequency of the output is dictated by grid requirements, and that the voltage is set at a constant level in accordance with the specifications of the low voltage link 14, in practice only the current of the AC output is controlled, and a converter controller 36 is provided for this purpose. The converter controller 36 and the turbine controller 27 in turn act on commands received from the PPC 8. In this respect, dashed lines in FIG. 3 represent lines of communication between the PPC 8, the turbine controller 27 and the converter controller 36.

The converter controller 36, the turbine controller 27 and the PPC 8 together form part of an overall control system that controls operation of the wind power plant 12.

As noted above, embodiments of the invention relate to control of energy storage devices incorporated into a wind power plant. In this respect, two such devices are shown in FIG. 3: a first energy storage device 44, which is electrically coupled to the DC link 30 of the power converter 22 and is operated by the converter controller 36; and a second energy storage device 46, which is electrically coupled to the wind turbine generator terminal 42 at the grid side of the power converter 22 and is controlled by the PPC 8.

As noted above, although only one wind turbine generator 1 is shown in FIG. 3, in practice a wind power plant typically includes a group of such wind turbine generators, and in such arrangements each wind turbine generator may include a respective energy storage device.

Having both the first energy storage device 44 and the second energy storage device 46 maximises the flexibility of the wind power plant 12 to respond to different operating scenarios. However, in practice it may be sufficient to provide energy storage devices in only one of these positions, namely either integrated into the or each wind turbine generator 1, or coupled to the point of common coupling, i.e. the wind turbine generator terminal 42 in this example.

Various other energy storage topologies are also possible. For example, the wind turbine generators of a wind power plant may be assigned to two or more sub-groups, each sub-group having a respective energy storage device.

In principle, various energy storage technologies could be used for the first energy storage device 44 or the second energy storage device 46. In practice, batteries and large capacitors are likely options.

The first energy storage device 44 has a state of charge (SoC) 44a, which is illustrated by a dashed line in FIG. 3. Above this, another dashed line represents an upper margin 44b for the SoC 44a, which is implemented to ensure that the device 44 always has reserve capacity to absorb power if required. Correspondingly, the first energy storage device 44 also has a lower margin 44c for the SoC 44a, which ensures that the device 44 always retains some charge, for example for use in grid events. For example, the lower margin 44c may represent 5% charge, and the upper margin 44b may correspond to 95% charge.

Similarly, the second energy storage device 46 is shown in FIG. 3 with dashed lines representing an SoC 46a, an upper margin 46b for the SoC 46a and a lower margin 46c for the SoC 46a.

As noted above, by modelling the input uncertainties probabilistically, embodiments of the invention beneficially allow the upper and lower margins 44, 46b, 44c, 46c to be set to 100% and 0% respectively, if desired.

The first energy storage device 44 and the second energy storage device 46 are each operable to charge and discharge selectively under the control of the converter controller 36 and the PPC 8 respectively. In this embodiment, the converter controller 36 controls the first energy storage device 44 based on commands received from the PPC 8. The charging/discharging strategies adopted for each energy storage device 44, 46 are determined by the PPC 8 using chance-constrained model predictive control to optimise the state of charge of each device 44, 46 at all times, as shall be explained in more detail below.

In this embodiment, each of the first and second energy storage devices 44, 46 is a DC device. The first energy storage device 44 is connected to the DC link of the power converter 22, and so can simply connect directly. The second energy storage device 46, however, must exchange electrical power with the low voltage link 14, which carries three-phase AC power. Accordingly, an AC/DC converter 48 is provided to act as an interface between the low voltage link 14 and the second energy storage device 46.

The first energy storage device 44 and the second energy storage device 46 each have a greatly increased storage capacity relative to either the smoothing capacitor 34 of the power converter 22 or the filter capacitors 40. This, combined with the ability for selective charging and discharging, significantly extends and refines the ability of the wind power plant 12 to match its output to grid requirements. In other words, the first and second energy storage devices 44, 46 enhance the virtual inertia of the wind power plant 12.

The position of the first energy storage device 44 within the power converter 22 is also ideal for augmenting operation of the wind turbine generator 1, for example to allow power to be consumed within the wind turbine generator 1 to reduce structural loads during high load conditions. Provided it holds sufficient charge, the first energy storage device 44 offers a source of electrical power that can be readily accessed to supplement the output of the generator 20 if necessary, in particular if the output of the generator is deliberately reduced to implement side-side torque damping and/or drivetrain torque damping at high load.

Correspondingly, the second energy storage device 46 is exposed to the combined output of all of the wind turbine generators 1 of the wind power plant 12, and is therefore ideally placed to smooth and adjust that output to match grid requirements.

Accordingly, in this embodiment the first energy storage device 44 is primarily used to assist operation of the wind turbine generator 1 in which it resides, and in particular to reduce structural loads arising in the wind turbine generator 1, whereas the second energy storage device 46 is primarily focused on aligning the output of the wind power plant 12 with grid requirements. However, each energy storage device 44, 46 can act to satisfy either role.

It follows from the above that the first energy storage device 44 draws electrical power from the DC link 30 when in a charging mode and outputs electrical power to the DC link 30 when in a discharging mode. Correspondingly, the second energy storage device 46 draws electrical power from the low voltage link 14 when in a charging mode, and dispenses electrical power to the low voltage link 14 when in a discharging mode.

FIG. 3 represents the power input to the machine-side converter 26 from the generator 20 as $P_{ref}$, while the power output from the line-side converter 28 is indicated as $P_{gref}$. The presence of the first energy storage device 44 between the machine-side converter 26 and the line-side converter 28 creates the potential for $P_{ref}$ and $P_{gref}$ to differ. So, a charge/discharge strategy for the first energy storage device 44 may be expressed in terms of target values for $P_{ref}$ and $P_{gref}$.

Correspondingly, charging or discharging the second energy storage device 46 impacts the relationship between $P_{gref}$ and $P_{PPC}$, and so these references may be used to define a charge/discharge strategy for the second energy storage device 46.

Operating either of the first and second energy storage devices 44, 46 in their respective charging modes typically entails drawing on power produced by the generator 20 and therefore reducing the electrical power that reaches the wind turbine generator terminal 42. In this scenario $P_{ref}$ exceeds $P_{gref}$, and/or $P_{gref}$ exceeds $P_{PPC}$.

However, each of the first and second energy storage devices 44, 46 are also able to draw power from the grid 19, beneficially enabling the wind power plant 12 to act as a load. This may be useful in various situations, including: recovering power when negative electricity prices arise due to overproduction; charging the devices to ensure capability to perform ancillary functions or to compensate for charge depletion due to wind events; and to allow frequency down-regulation. In this scenario, $P_{gref}$ may exceed $P_{ref}$, and $P_{PPC}$ may exceed $P_{gref}$.

With the physical hardware described, the control strategies introduced above by which the energy storage devices 44, 46 are controlled shall now be considered in more detail.

As already noted, embodiments of the invention seek to optimise the SoC 44a, 46a of each of the energy storage devices 44, 46 by taking into account uncertainties in inputs to the wind power plant 12. These uncertainties are incorporated by modelling them probabilistically, for example to produce a probability density function representing a probability forecast of the input. In parallel, limits are applied to chance-constraints relating to operation of the wind power plant 12. These limits are used in combination with the probability density function for each input to generate hard constraints, or 'device constraints', for operation of the first and second energy storage devices 44, 46 that feed into a model of the wind power plant 12 that is configured according to the principles of model predictive control. In this respect, while using model predictive control in the context of operating a wind power plant is known for other purposes, introducing chance-constraints allows further optimisation, which is especially useful for control of energy storage devices.

The most relevant inputs having significant uncertainty are wind conditions—or power production in dependence on wind conditions—and the state of the grid 19. In this embodiment, control of the first energy storage device 44 prioritises uncertainties associated with wind conditions, as load effects of wind changes are local to the first energy storage device 44. Correspondingly, control of the second energy storage device 46 prioritises uncertainties associated with the state of the grid 19. In other embodiments the reverse may be the case, and typically each device 44, 46 is controlled to account for all uncertainties for which data is available, at least to some extent.

The main objectives underlying the optimisation are to define values for $P_{ref}$ and $P_{gref}$ that enable the wind power plant 12 to comply with grid requirements, maximise the produced power $P_{PPC}$ and minimise structural loading on the or each wind turbine generator 1. Other objectives may include reducing the frequency of charge/discharge cycles for each energy storage device 44, 46 to minimise wear, and avoiding penalties for failing to meet grid requirements.

Meeting these objectives amounts to defining a suitable charge/discharge strategy for each of the first and second energy storage devices 44, 46, and so at the most basic level entails finding an optimal SoC 44a, 46a for each device 44, 46 at any given time.

In practice, the outputs of the optimisation process may be control signals for effecting charging or discharging of the first and second energy storage devices 44, 46, which may be expressed as charge/discharge commands and/or as target values for $P_{ref}$, $P_{gref}$ and $P_{PPC}$. Control signals may also be generated for adjusting aspects of the operation of a wind turbine generator 1 that impact operation of an energy storage device 44, 46. For example, the PPC 8 may generate setpoint commands to derate or overboost the wind turbine generator 1 to influence power production in a complementary manner to the charge/discharge strategy for the or each energy storage device 44, 46.

As the skilled reader will appreciate, in broad terms a standard optimisation problem may be expressed as:

$$\begin{aligned}\min \quad & f(x, \xi) \\ \text{subject to} \quad & g(x, \xi) = 0 \\ & h(x, \xi) \geq 0\end{aligned}$$

where $\xi$ is the vector of uncertainty. Under the chance-constrained method, the inequality constraint is formulated as:

$$P(h(x,\xi) \geq 0) \geq p$$

where $p \in [0, 1]$ is the probability density function of fulfilling the constraint $h(x, \xi) \geq 0$. Thus, to minimise $f(x, \xi)$, this approach sets limits on the extent to which the chance-constraints may be violated within a predetermined time period, or 'window', which in this case entails finding an optimal SoC 44a, 46a for each of the first and second energy storage devices 44, 46.

The relevant window for each constraint may be different, and may be fixed in advance, for example if the grid 19 dictates the window explicitly or implicitly as part of a constraint. Alternatively, the window may be adjusted as part of the control approach. For constraints having a finite tail, for example those with an upper limit to the severity, it may be possible to operate with a zero chance of violating the constraint, so that the window is effectively infinite. An example of a constraint having a finite tail is power production, which is limited by the electrical characteristics of each wind turbine generator 1. While power production by a wind turbine generator 1 depends on wind conditions and is therefore uncertain, it cannot exceed the physical limitations of the wind turbine generator 1.

Although the following description reflects how the chance-constrained model predictive control approach may be used to solve the optimisation problem in the context of the wind power plant 12 described above, it is noted that the optimisation problem is solved for each energy storage device 44, 46 and can be solved if only one such device is present in the wind power plant 12. Where multiple energy storage devices are present, however, they can be considered collectively within the analysis. For example, the problem could be formulated so as to find an optimum collective state of charge across all energy storage devices, so that the distributed energy storage devices are treated as a unified energy source. This will depend to some extent on where the energy storage devices 44, 46 are positioned within the wind power plant 12, however. For example, while it may be relatively straightforward to treat devices on the line-side as unified, storage devices that are integrated into power converters may need to be responsive to the individual needs of their respective wind turbine generators.

In this embodiment, the optimisation problem is solved for each energy storage device 44, 46 by the PPC 8 to determine a charge/discharge strategy for each device 44, 46. The charge/discharge strategy generated for the first energy storage device 44 is then transmitted to the converter controller 36 to be implemented. The charge/discharge strategy for the second energy storage device 46 is implemented by the PPC 8 directly. In other embodiments, the converter controller 36 may implement its own optimisation to determine a charge/discharge strategy for the first energy storage device 44 independently.

As noted earlier, the PPC 8 has access to data that is indicative of wind conditions, as well as data indicating the state of the grid 19.

The data that is indicative of wind conditions may include measurements of instantaneous parameters such as wind speed and direction, turbulence intensity and shear. The PPC 8 may also have access to data that enhances its ability to assess how wind conditions may change over a predefined window. For example, the PPC 8 may receive or hold site map data, meteorological data and data from Lidar sensors. It is also noted that present conditions at one location in the wind power plant 12 may be indicative of future conditions at another point in the power plant 12, and so this can also be taken into account.

By analysing such data, the PPC 8 can derive a probability forecast such as a probability density function indicating relative probabilities for the occurrence of a range of changes to wind conditions within the defined window. The changes that may be characterised probabilistically may include changes in turbulence intensity and low frequency changes in mean wind speed, as well as the occurrence of more extreme wind conditions such as gusts, changes in wind direction and the occurrence of extreme positive or negative shear. For example, a probability density function computed by the PPC 8 may indicate, over a window of two minutes, probabilities for gusts at different speeds, directions and/or durations.

For the grid 19, the key uncertainties that need to be predicted to optimise operation of the first and second energy storage devices 44, 46 are the occurrence of critical events. Such events may include a variety of faults, such as a weak grid scenario arising or sudden changes manifesting in the grid voltage in terms of its frequency, phase or amplitude, including low voltage and under voltage situations. Other grid events may include: changes in power consumption by loads connected to the grid; planned changes to the grid, such as adding new loads; real-time electricity price fluctuations; and ancillary service needs arising, such as inertia emulation, primary/secondary frequency control and fast ramping.

Another uncertainty comes in the form of inter/intra-area oscillation, which relates to the occurrence of resonance—and, in turn, oscillating power and voltage—as a result of exciting natural frequencies, or eigenmodes, when the signals of different wind turbine generators are combined. In this respect, the signals from each generator, or transmission line, have characteristics that reflect the individual inertia, time constants, delay and capacitance of the generator and/or transmission line. For example, a pair of independent wind turbine generators within the power plant may produce outputs that are slightly out-of-phase.

To assess the probability of such events occurring within the predefined time window, the PPC 8 can process various types of data alongside indications of the present state of the grid 19 and/or demands received from the grid 19, such as the design of the grid 19, including known vulnerabilities, and historical data indicating grid behaviour. In addition, plant-level and turbine-level techniques for detecting weak grids are known, and these can feed into the analysis performed by the PPC 8. Forecasts entered by grid operators based on planned changes to the grid 19 may also be taken into account.

Similarly to the other inputs that are analysed, the output from this stage of the analysis is a probability density function indicating the likelihood of grid events occurring within the predefined window.

Another form of uncertainty that may be taken into account is the need to power ancillary services, such as frost protection systems. Such systems can consume a significant level of power internally and so may cause a disturbance to the power output if not taken into account.

Modelling the above inputs to the wind power plant 12 in a probabilistic manner in the context of optimising the SoC 44*a*, 46*a* of each energy storage device 44, 46 gives rise to a set of chance-constraints, which can be tailored to each application. Limits are applied to these chance-constraints, each limit defining the proportion of time for which the respective chance-constraint may be violated in the long term.

The chance-constraint limits are then converted, using the probability density functions for the inputs, into hard device constraints for operation of the energy storage devices 44, 46. These device constraints then feed into a chance-constrained model predictive control analysis to determine optimal values for the SoC 44*a*, 46*a* of each energy storage device 44, 46.

Some examples of chance-constraints that may be used as a precursor for the chance-constrained model predictive control analysis are set out below.

A first chance-constraint may be for the first and/or second energy storage device 44, 46 to have capacity to provide virtual inertia, and a typical limit for this constraint may be that it must be satisfied more than 99% of the time. This entails the device 44, 46 having an SoC 44*a*, 46*a* at a level between the upper and lower margins 44*b*, 46*b*, 44*c*, 46*c* so that the device 44, 46 is able to charge and/or discharge electrical power as may be necessary to provide inertia, for example when there are fluctuations in the power production of a wind turbine generator 1 of the wind power plant 12.

A similar chance-constraint limit would be to ensure that the first and/or second energy storage device 44, 46 has capacity for grid frequency control more than 99% of the time, especially where the wind power plant 12 contributes to a primary reserve that enables the grid 19 to respond quickly to changes in demand and/or production. This chance-constraint is therefore responsive to a grid event in which the grid frequency deviates from a nominal level.

Other chance-constraint limits related to grid events are to ensure that the first and/or second energy storage device 44, 46 has capacity for reactive power injection more than 95% of the time, and/or to supply active power alongside reactive power when demanded. In this respect, the inclusion of the first and/or second energy storage device 44, 46 is expected to be particularly useful for alleviating the latter of these constraints.

Further chance-constraints related to grid events include ensuring capacity for grid oscillation damping more than 99% of the time, maintaining the ability to follow specified power output profiles during low voltage ride-through/under voltage ride-through events more than 99% of the time, or provision for limiting the ramp rate of the output $P_{PPC}$ to the grid 19 more than 99% of the time.

Some chance-constraints related to reducing structural loading on a wind turbine generator 1 include ensuring the first and/or second energy storage device 44, 46 has capacity to provide side-side torque damping and/or drivetrain torque damping more than 98% of the time. Another chance-constraint related to structural loading is to ensure that for more than 90% of the time the energy storage device 44, 46 has capacity for upward yaw control/hydraulic pressure for at least five minutes in the event of a grid error in a context of critical wind speeds. These chance-constraints are primarily relevant for the first energy storage device 44, which as noted above may be focused on augmenting operation of the wind turbine generator 1 in which it resides for reduced structural loads, in particular in response to grid events. However, the second energy storage device 46 may also be used for this purpose and so may be controlled against these chance-constraints also.

A further relevant chance-constraint is to ensure the first and/or second energy storage device 44, 46 has capacity to maintain power variation at certain frequencies on the power spectrum, or 'power-line flicker', below the regulatory limit more than 99% of time.

A final example of a chance-constraint that may be taken into account is a requirement to limit noise to a prescribed threshold at least 95% of the time, which typically entails controlling blade pitch and/or rotor speed to limit noise under certain wind conditions or at particular times.

The above examples demonstrate typical chance-constraints that arise in the context of optimising the SoC 44*a*, 46 of an energy storage device 44, 46 within a wind power plant 12, and moreover how these chance-constraints can be prioritised by adjusting the respective risks of failing to fulfil each of them. So, chance-constraints that are required to be satisfied in more than 99% of cases, for example those relating to assisting grid recovery, are of higher priority than chance-constraints that must only be satisfied 95% of the time, such as limiting noise. This prioritisation can be adjusted for each application, and will typically reflect the consequences of violating each constraint.

The risks of failing to meet each chance-constraint relate to the storage constraints of each energy storage device, to the extent that failure to satisfy a chance-constraint typically means that the storage limits of a device have been reached. For example, a chance-constraint that requires the energy storage device 44, 46 to discharge power may not be satisfied if the device 44, 46 is already fully discharged. Conversely, a fully charged device cannot consume power to meet a chance-constraint.

It follows from the above that assigning a respective limit to each chance-constraint may be considered as effectively prescribing a likelihood of meeting grid requirements. This likelihood can therefore be prescribed explicitly in the optimisation problem, and so can be used as a design parameter that can be adjusted for each application according to the requirements imposed on a wind power plant and/or wind turbine generator by a power grid. This in turn affords greater flexibility in how the wind power plant 12 is operated, allowing enhanced optimisation in various respects. In particular, this approach enables the power output of the wind power plant 12 to be maximised whilst controlling the extent to which constraints pertaining to grid requirements are violated.

Figure 4:
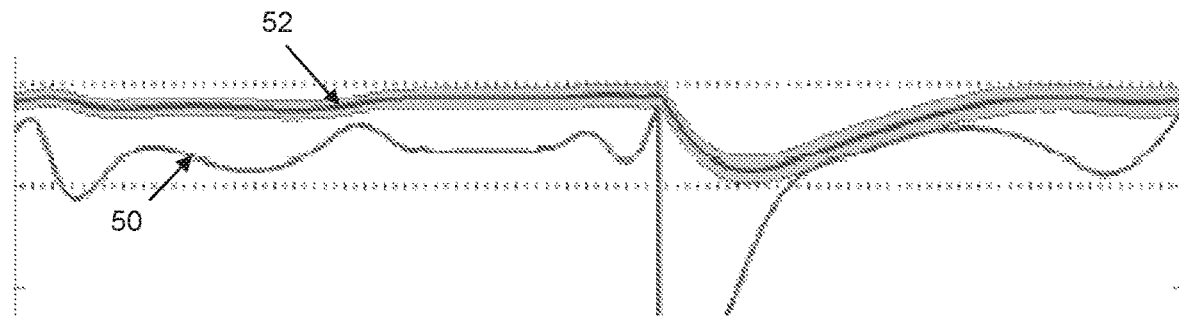
FIG. 4 is a graph showing time plots of a control input and a power plant output.

FIG. 4 illustrates graphically how the optimisation process set out above improves the performance of the wind power plant 12 in practice. FIG. 4 shows two time-plots: a lower plot 50, which represents a control input to the power plant 12; and an upper plot 52, which represents the power production $P_{PPC}$ of the wind power plant 12. Upper and lower horizontal dashed lines in FIG. 4 denote margins within which power production must be held to satisfy grid requirements.

The upper plot 52 comprises a solid line surrounded by a shaded region. The solid line represents a certainty equivalent output from the wind power plant 12, namely the output that would be achieved in the absence of uncertainties. The shaded region represents the area within which the actual output may deviate due to uncertainties with a probability of 99%. In other words, the shaded region represents the potential impact of the chance-constraints in 99% of cases. Accordingly, to fulfil grid requirements 99% of the time, this shaded region must be kept within the lower and upper margins.

In this example, the shaded region has been calculated by applying a Monte Carlo analysis to the results of a series of simulations of the system in which different uncertainties are realised at random.

Figure 5:
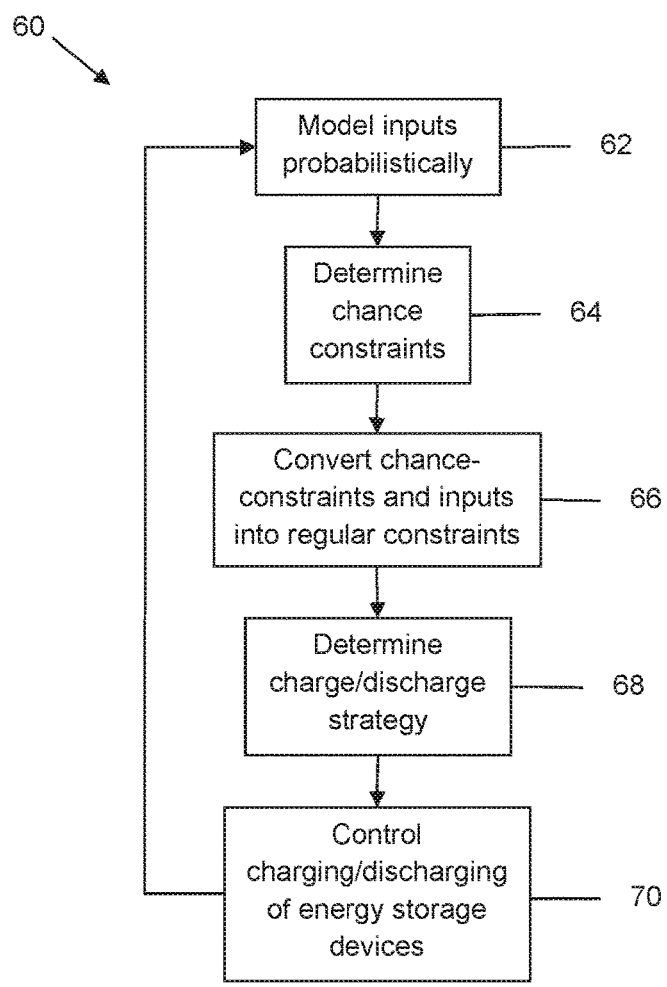
FIG. 5 is a flow diagram showing a process for controlling the wind power plant of FIG. 3.

FIG. 5 is a flow diagram summarising a process 60 for controlling the wind power plant 12, which is performed by the PPC 8 in this example.

The process 60 begins with the PPC 8 processing data relating to one or more inputs to the wind power plant 12 at step 62, to model the input uncertainties probabilistically to obtain a probability forecast for each input to the power plant 12. For example, the probability forecast may be in the form of a probability density function. The data relating to inputs to the wind power plant 12 may comprise the data indicative of a state of the grid 19 and/or data indicative of wind conditions, this data being received at the input 9 of the PPC 8. In an embodiment, only the state of the grid 19 may be taken into account, in particular if only the second energy storage device 46 is present in the wind power plant 12.

The process 60 continues with the PPC 8 determining, at step 64, limits for the relevant chance-constraints governing operation of the wind power plant 12. A chance-constraint relates to satisfying operational requirements, and the limit of each chance-constraint is the likelihood of satisfying the constraint, typically expressed in terms of a percentage of operation time in which the constraint will not be violated in the long term. For example, a limit for successfully delivering active power to the grid 19 when demanded may be set at 99% of the time, meaning that it is allowable for the wind power plant 12 to fail to deliver active power demanded by the grid up to 1% of the time in the long term.

Each limit is determined according to operational objectives and grid requirements, and so differs for each application. Determining a chance-constraint limit may entail obtaining it from an internal memory, receiving a limit from an external source such as the grid 19, or a user defining a constraint limit via an interface to the PPC 8.

The PPC 8 then uses the probability density functions generated for the inputs to the wind power plant 12 to convert, at step 66, the chance-constraint limits identified in the previous step into hard device constraints for the SoC 44a, 46a of each energy storage device 44, 46. These device constraints may include upper and lower thresholds for the SoC 44a, 46a for each device, and maximum charging or discharging rates, for example.

The device constraints are configured such that if they are adhered to and the energy storage devices 44, 46 are operated within them, each chance-constraint will not be violated beyond its respective limit. So, referring again to the above example, meeting the device constraints for each energy storage device 44, 46 will ensure that the wind power plant 12 delivers active power to the grid 19 when demanded at least 99% of the time in the long term.

The next step of the process 60 is to determine, at step 68, a charge/discharge strategy for each energy storage device 44, 46 based on the device constraints derived for the SoC 44a, 46a of each energy storage device 44, 46. A charge/discharge strategy may take the form of a respective setpoint for each energy storage device 44, 46, for example. Alternatively, the charge/discharge strategy may comprise rates of charging or discharging for each device 44, 46.

The charge/discharge strategy is determined by solving a receding horizon optimisation problem over a defined window using a model predictive control algorithm, to find an optimal SoC 44a, 46a for each energy storage device 44, 46.

The optimisation problem takes into account the initial conditions of the system, a set of equality constraints, a set of inequality constraints, and a cost function. The initial conditions include, for example, the present wind conditions, grid state and the SoC 44a, 46a of each storage device 44, 46. The equality constraints define a system model representing the system dynamics. The inequality constraints include the device constraints derived in step 66 and other operational constraints, including the storage capacity of each storage device 44, 46. The cost function dictates the form of solution required from the optimisation problem, and may be configured in various ways. For example, the cost function may be arranged to account for differences between power production and power output relative to the inputs to and demands on the wind power plant 12, and deviances in the SoC 44a, 46a of each storage device 44, 46 from desired values. The cost function may alternatively be configured to ensure the wind power plant 12 operates in the most cost effective manner, for example by maximising power production whilst minimising structural loading on the wind turbine generators 1 and charging cycles for the energy storage devices 44, 46.

Solving the optimisation problem generates a control action relating to a charge/discharge strategy for the energy storage devices 44, 46, which as noted above may be in the form of respective setpoints for the SoC 44a, 46a of each device 44, 46.

Finally, the PPC 8 implements the charge/discharge strategy determined in the previous step and controls, at step 70, charging and discharging of the energy storage devices 44, 46 in accordance with the output of the optimisation problem, for example the setpoint SoC for each energy storage device 44, 46. In a broad sense, therefore, the energy storage devices 44, 46 are controlled in accordance with the probability forecasts for each input, such as the grid state.

It is noted that control of the first energy storage device 44 typically entails the PPC 8 issuing a control command to the converter controller 36. The second energy storage device 46 is controlled by the PPC 8 directly in this embodiment.

The process 60 then reiterates continuously, with the PPC 8 first updating the probabilistic models of the input uncertainties and then updating the chance-constraints and device constraints accordingly. The charge/discharge strategies for each energy storage device 44, 46, for example the respective setpoint states of charge, are therefore updated dynamically to reflect any changes to the input data, the states of charge of the devices 44, 46 and/or the constraints.

The skilled person will appreciate that modifications may be made to the specific embodiments described above without departing from the inventive concept as defined by the claims.

The invention claimed is:

1. A method of controlling a wind power plant including an energy storage device, the wind power plant being connected to a power grid and comprising one or more wind turbine generators that produce electrical power for delivery to the power grid, the method comprising:
processing grid data related to the power grid to determine a probability forecast for a future state of the power grid, wherein the probability forecast for the future state of the power grid provides an indication of relative probabilities of a range of future grid events possibly occurring on the power grid over a time window, wherein the range of future grid events includes: i) fault events resulting from under voltage or frequency on the power grid; and ii) at least one of the following grid events: changes in power consumption by loads connected to the power grid; adding new loads to the power grid; and real-time electricity price fluctuations associated with the power grid; and
controlling charging and discharging of the energy storage device in accordance with the probability forecast.

2. The method of claim 1, comprising:
determining a set of chance-constraints relating to operation of the wind power plant;
determining respective limits for each chance-constraint of the set;
determining, based on each chance-constraint limit and the probability forecast, a set of device constraints relating to charging and/or discharging of the energy storage device; and
controlling charging and discharging of the energy storage device to avoid violating the device constraints.

3. The method of claim 2, comprising:
solving an optimisation problem for controlling charging and discharging of the energy storage device, wherein the optimisation problem comprises the device constraints; and
controlling charging and discharging of the energy storage device based on a control output of the optimisation problem.

4. The method of claim 3, comprising solving the optimization problem using a predictive algorithm.

5. The method of claim 4, comprising simulating operation of the wind power plant using the predictive algorithm.

6. The method of claim 4, wherein the predictive algorithm is based on a chance-constrained model predictive control strategy.

7. The method of claim 2, wherein each limit defines a proportion of operation time of the wind power plant for which the respective chance-constraint may be violated.

8. The method of claim 2, wherein each chance-constraint of the set of chance-constraints comprises a requirement to provide any of the following: virtual inertia; defined power output profiles during a voltage ride-through event; power-line flicker reduction; reactive power injection; grid oscillation damping; side-side torque damping; drivetrain torque damping; upward yaw control; and noise below a threshold level.

9. The method of claim 1, comprising determining a state of charge setpoint for the energy storage device, and controlling charging and discharging of the energy storage device in accordance with the state of charge setpoint.

10. The method of claim 1, wherein the probability forecast comprises any of: a cumulative distribution function; and a probability density function.

11. The method of claim 1, comprising processing data indicative of wind conditions to determine a probability forecast for wind conditions, and controlling charging and discharging of the energy storage device in accordance with the probability forecast for wind conditions.

12. The method of claim 1, comprising controlling charging and discharging of the energy storage device in accordance with a prescribed probability of violating one or more grid requirements.

13. The method of claim 1, wherein the grid data comprises any of the following: data indicative of a state of the power grid; a ramp-rate limit with respect to the power delivered to the power grid; a request received from the power grid; grid design data; historical grid data; data indicative of a weak grid obtained from plant-level and/or turbine-level analysis; electricity pricing data; and user-entered forecasts indicative of planned changes to the power grid.

14. The method of claim 1, comprising altering operation of one or more wind turbine generators of the wind power plant in accordance with the or each probability forecast, and controlling charging and discharging of the energy storage device in accordance with the altered operation of the or each wind turbine generator.

15. The method of claim 1, wherein the energy storage device is electrically coupled to a point of common coupling at which the wind power plant connects to the power grid, or is integrated into a wind turbine generator of the wind power plant.

16. The method of claim 1, wherein the probability forecast comprises a probability density function that indicates, over the time window, probabilities for wind gusts at different speeds, directions, and durations.

17. The method of claim 1, wherein the range of future grid events includes a grid event associated with power and voltage oscillation caused by signals of different ones of the one or more wind turbine generators being combined.

18. A control system for a wind power plant including an energy storage device, the wind power plant being connected to a power grid and comprising one or more wind turbine generators that produce electrical power for delivery to the power grid, the control system comprising:
an input configured to receive grid data related to the power grid;
a processing module configured to:
process the grid data to determine a probability forecast for a future state of the grid, wherein the probability forecast for the future state of the power grid provides an indication of relative probabilities of a range of future grid events possibly occurring on the power grid over a time window, wherein the range of future grid events includes: i) fault events resulting from under voltage or frequency on the power grid; and ii) at least one of the following grid events: changes in power consumption by loads connected to the power grid; adding new loads to the power grid; and real-time electricity price fluctuations associated with the power grid; and
generate a control signal arranged to control charging and discharging of the energy storage device in accordance with the probability forecast; and
an output configured to output the control signal.

19. A wind power plant connected to a power grid, comprising:
- an energy storage device;
- at least one wind turbine, comprising:
  - a tower;
  - a nacelle disposed on the tower;
  - a generator disposed in the nacelle and configured to produce electrical power for delivery to the power grid;
  - a rotor coupled to the generator; and
  - a plurality of blades disposed at a distal end of the rotor; and
- a control system, comprising:
  - an input configured to receive grid data related to the power grid;
  - a processing module configured to:
    - process the grid data to determine a probability forecast for a future state of the grid, wherein the probability forecast for the future state of the power grid provides an indication of relative probabilities of a range of future grid events possibly occurring on the power grid over a time window, wherein the range of future grid events includes: i) fault events resulting from under voltage or frequency on the power grid; and ii) at least one of the following grid events: changes in power consumption by loads connected to the power grid; adding new loads to the power grid; and real-time electricity price fluctuations associated with the power grid; and
    - generate a control signal arranged to control charging and discharging of the energy storage device in accordance with the probability forecast; and
  - an output configured to output the control signal.

20. The wind power plant of claim 19, wherein the processing module is further configured to:
- determine a set of chance-constraints relating to operation of the wind power plant;
- determine respective limits for each chance-constraint of the set;
- determine, based on each chance-constraint limit and the probability forecast, a set of device constraints relating to charging and/or discharging of the energy storage device; and
- control charging and discharging of the energy storage device to avoid violating the device constraints.

* * * * *